(12) United States Patent
Saito et al.

(10) Patent No.: US 11,603,046 B2
(45) Date of Patent: Mar. 14, 2023

(54) ESCAPE TOOL HOUSING MEMBER

(71) Applicant: HONDA ACCESS CORP., Niiza (JP)

(72) Inventors: Akihiko Saito, Niiza (JP); Shinpei Takenaka, Niiza (JP)

(73) Assignee: HONDA ACCESS CORP., Niiza (JP)

( * ) Notice: Subject to any disclaimer, the term of this patent is extended or adjusted under 35 U.S.C. 154(b) by 4 days.

(21) Appl. No.: 17/160,994

(22) Filed: Jan. 28, 2021

(65) Prior Publication Data
US 2021/0146848 A1 May 20, 2021

Related U.S. Application Data

(63) Continuation of application No. PCT/JP2019/017937, filed on Apr. 26, 2019.

(30) Foreign Application Priority Data

Sep. 19, 2018 (JP) .............................. JP2018-174562

(51) Int. Cl.
*B60R 7/04* (2006.01)
(52) U.S. Cl.
CPC ..................... *B60R 7/04* (2013.01)
(58) Field of Classification Search
CPC .. B60R 7/04; B60N 3/02; B62D 11/06; Y10T 74/2087; Y10T 74/20876
See application file for complete search history.

(56) References Cited

U.S. PATENT DOCUMENTS

| 2,274,605 | A | * | 2/1942 | Hoffmeister | ........... | A45C 13/26 |
| | | | | | | 294/171 |
| 4,262,385 | A | * | 4/1981 | Norman | .................... | A45F 5/10 |
| | | | | | | 294/149 |
| 4,377,306 | A | * | 3/1983 | Abatecola | ............ | A63C 11/025 |
| | | | | | | 294/162 |
| 4,461,412 | A | * | 7/1984 | Langland | .................. | B60R 7/04 |
| | | | | | | 224/543 |

(Continued)

FOREIGN PATENT DOCUMENTS

| CN | 2538607 Y | 3/2003 |
| JP | 3-91844 U | 9/1991 |

(Continued)

OTHER PUBLICATIONS

International Search Report dated Jul. 9, 2019, issued in counterpart International Application No. PCT/JP2019/017937. (2 pages).

*Primary Examiner* — Brian D Nash
(74) *Attorney, Agent, or Firm* — WHDA, LLP

(57) ABSTRACT

Provided is an escape tool housing member to be wound around an assist grip of a vehicle, in which a main body is to be wound around a grip portion, and a housing portion housing an escape tool is arranged to abut against an inner side of the grip portion. By pinching and then pulling with fingers a left convex portion, a pull portion, a concave portion and a right convex portion that are positioned on a front surface side of the grip portion, a left inner fixation portion and a left outer fixation portion will be disconnected from each other, and a right inner fixation portion and a right outer fixation portion will be disconnected from each other as well, thereby allowing the escape tool housing member to be removed from the assist grip.

4 Claims, 6 Drawing Sheets

(56) References Cited

U.S. PATENT DOCUMENTS

| | | | | |
|---|---|---|---|---|
| 4,553,779 A * | 11/1985 | Shortridge | A63C 11/025 | 294/162 |
| 5,469,601 A * | 11/1995 | Jackson | B25G 1/10 | D8/322 |
| 5,487,582 A * | 1/1996 | Bourgeois | A45F 5/1046 | 294/146 |
| 5,511,445 A * | 4/1996 | Hildebrandt | B62K 21/26 | 81/177.1 |
| 5,611,588 A * | 3/1997 | Mencel | A63C 11/02 | 294/149 |
| 5,700,053 A * | 12/1997 | Downing | A47C 31/11 | 5/663 |
| 5,722,118 A * | 3/1998 | Hansen | A45F 5/102 | 16/113.1 |
| 5,743,154 A * | 4/1998 | Jacinth | B62D 1/06 | 74/558 |
| 5,775,756 A * | 7/1998 | Rozenich | A63B 21/4017 | 482/106 |
| 5,867,868 A * | 2/1999 | Ward | A63B 60/10 | 294/171 |
| 5,934,425 A * | 8/1999 | Sadow | A45C 13/262 | 280/37 |
| 6,006,403 A * | 12/1999 | Battiato | B25G 1/10 | 16/421 |
| D426,707 S * | 6/2000 | Huang | | D3/327 |
| D448,663 S * | 10/2001 | Raftree | | D9/434 |
| 6,357,639 B1 * | 3/2002 | Williams | A01K 97/10 | 224/245 |
| 6,401,889 B1 * | 6/2002 | McCleskey | A45C 13/18 | 190/102 |
| 6,554,033 B2 * | 4/2003 | Hydon | A45C 13/42 | 40/6 |
| 6,604,789 B1 * | 8/2003 | Downing | A47C 31/11 | 5/663 |
| 6,796,002 B2 * | 9/2004 | Beckwith | A45C 13/26 | 16/110.1 |
| 7,874,602 B2 * | 1/2011 | Meckwood | A45F 5/102 | 294/158 |
| 8,182,008 B2 * | 5/2012 | Meckwood | A45F 5/1046 | 294/158 |
| 8,695,168 B1 * | 4/2014 | Cepeda | B25G 1/10 | 16/431 |
| D813,487 S * | 3/2018 | Eskridge | | D34/27 |
| D816,339 S * | 5/2018 | Giamanco | | D3/315 |
| D846,878 S * | 4/2019 | Moore | | D3/318 |
| 10,343,575 B1 * | 7/2019 | Lynn | | B60N 3/023 |
| 2002/0066164 A1 * | 6/2002 | White | B62B 5/06 | 16/436 |
| 2003/0130070 A1 * | 7/2003 | Nolan | A63B 69/0002 | 473/437 |
| 2005/0040194 A1 * | 2/2005 | Frye | B25H 3/00 | 224/219 |
| 2006/0210763 A1 * | 9/2006 | Holms | B32B 25/10 | 428/100 |
| 2007/0235484 A1 * | 10/2007 | Staniszewski | B60R 7/05 | 224/312 |
| 2007/0251963 A1 | 11/2007 | Lin | | |
| 2011/0086335 A1 * | 4/2011 | Rogers | B43L 15/00 | 434/408 |
| 2013/0126540 A1 * | 5/2013 | Vesterby | B65D 37/00 | 220/737 |

FOREIGN PATENT DOCUMENTS

| | | |
|---|---|---|
| JP | 6-190866 A | 7/1994 |
| JP | 2003-182431 A | 7/2003 |
| JP | 2005-313762 A | 11/2005 |
| JP | 2007-284052 A | 11/2007 |

\* cited by examiner

ESCAPE TOOL HOUSING MEMBER

CROSS-REFERENCE TO RELATED APPLICATIONS

The present application is a continuation application of International Application No. PCT/JP2019/017937, filed Apr. 26, 2019, which claims priority to Japanese Patent Application No. 2018-174562, filed Sep. 19, 2018. The contents of these applications are incorporated herein by reference in their entirety.

BACKGROUND OF THE INVENTION

Field of the Invention

The present invention relates to an escape tool housing member to be wound around an assist grip that is to be attached to a vehicle interior member.

Background Art

Conventionally, as such a kind of member, there is known an assist grip that is to be installed in the interior of a vehicle, and has a grip portion extended into the shape of a bar; a curved portion as a bent portion continuous with at least one end of the grip portion; and an attachment portion which is continuous with the curved portion and is to be attached to an interior member of the vehicle.

This assist grip is such that a housing portion continuous with an opening section formed on a curved portion side is formed inside the grip portion, and that since an escape hamper is housed in the housing portion, the escape hammer can be stored in the assist grip in a compact manner. Further, since there are provided a coil spring as a biasing member for biasing the escape hammer toward an opening section side, a restriction portion for restricting the movement of the escape hammer, and a push button for unlocking the restriction of the restriction portion, the hamper can be easily installed in and removed from the assist grip.

SUMMARY OF THE INVENTION

A first aspect of the present invention is an escape tool housing member to be wound around an assist grip that is to be attached to a vehicle interior member. This escape tool housing member has a sheet-shaped main body; a housing portion that is provided on an inner side of the main body and houses an escape tool; an inner fixation portion provided on the inner side of the main body; and an outer fixation portion provided on an outer side of the main body. The main body is capable of being fixed to the assist grip by connecting the inner fixation portion and the outer fixation portion. Moreover, the inner fixation portion and the housing portion are adjacent or proximal to each other.

Further, a second aspect of the present invention is such that the assist grip has: a grip portion extended into the shape of a bar; and an attachment portion allowing the grip portion to be attached to the vehicle interior member. Moreover, the housing portion houses the escape tool arranged along a longer direction of the grip portion.

Furthermore, a third aspect of the present invention is such that a pull portion is provided on the outer side of the main body.

Furthermore, a fourth aspect of the present invention is such that a convex portion and a concave portion are provided at one end of the main body.

Furthermore, a fifth aspect of the present invention is such that the inner fixation portion is provided at the convex portion, and the outer fixation portion is provided at the other end of the main body.

Furthermore, a sixth aspect of the present invention is such that the escape tool housing member is to be wound with the housing portion being interposed between the attachment portions and abutting against an inner side of the grip portion, and with the pull portion being positioned proximal to a side surface joined to the inner side of the grip portion.

Furthermore, a seventh aspect of the present invention is such that the assist grip is capable of rotating about a shaft portion provided at the attachment portion.

According to the configuration described in the first aspect, the main body is to be wound around a general assist grip normally installed in a vehicle, and the inner fixation portion and the outer fixation portion can then be connected to each other, thereby allowing the main body to be retrofitted to the assist grip easily.

According to the configuration described in the second aspect, the escape tool can be arranged along the longer direction of the grip portion of the assist grip, thereby allowing the escape tool housing member to be retrofitted in a compact manner.

According to the configuration described in the third aspect, the inner fixation portion and the outer fixation portion can be easily disconnected from each other by pulling the pull portion.

According to the configuration described in the fourth aspect, the inner fixation portion and the outer fixation portion can be easily disconnected from each other by pulling the convex portion or the concave portion.

According to the configuration described in the fifth aspect, the inner fixation portion and the outer fixation portion can be easily disconnected from each other, since fingers can be put inside the concave portion to pull the same.

According to the configuration described in the sixth aspect, the escape tool can be housed in a compact manner, and will not be a hindrance when grabbing the grip portion of the assist grip.

According to the configuration described in the seventh aspect, the assist grip can be rotated to a position suitable for use by a user before use.

DETAILED DESCRIPTION OF THE INVENTION

An embodiment of an escape tool housing member of the present invention are described hereunder with reference to the drawings. The embodiment described hereunder shall not limit the contents of the present invention that are described in the claims. Further, not all the structures described hereunder are necessarily the essential elements of the present invention. Here, the upper, lower, left and right sides in FIG. 1 respectively correspond to the upper, lower, left and right sides of an escape tool housing member 1 for the sake of explanation.

First Embodiment

Figure 1:
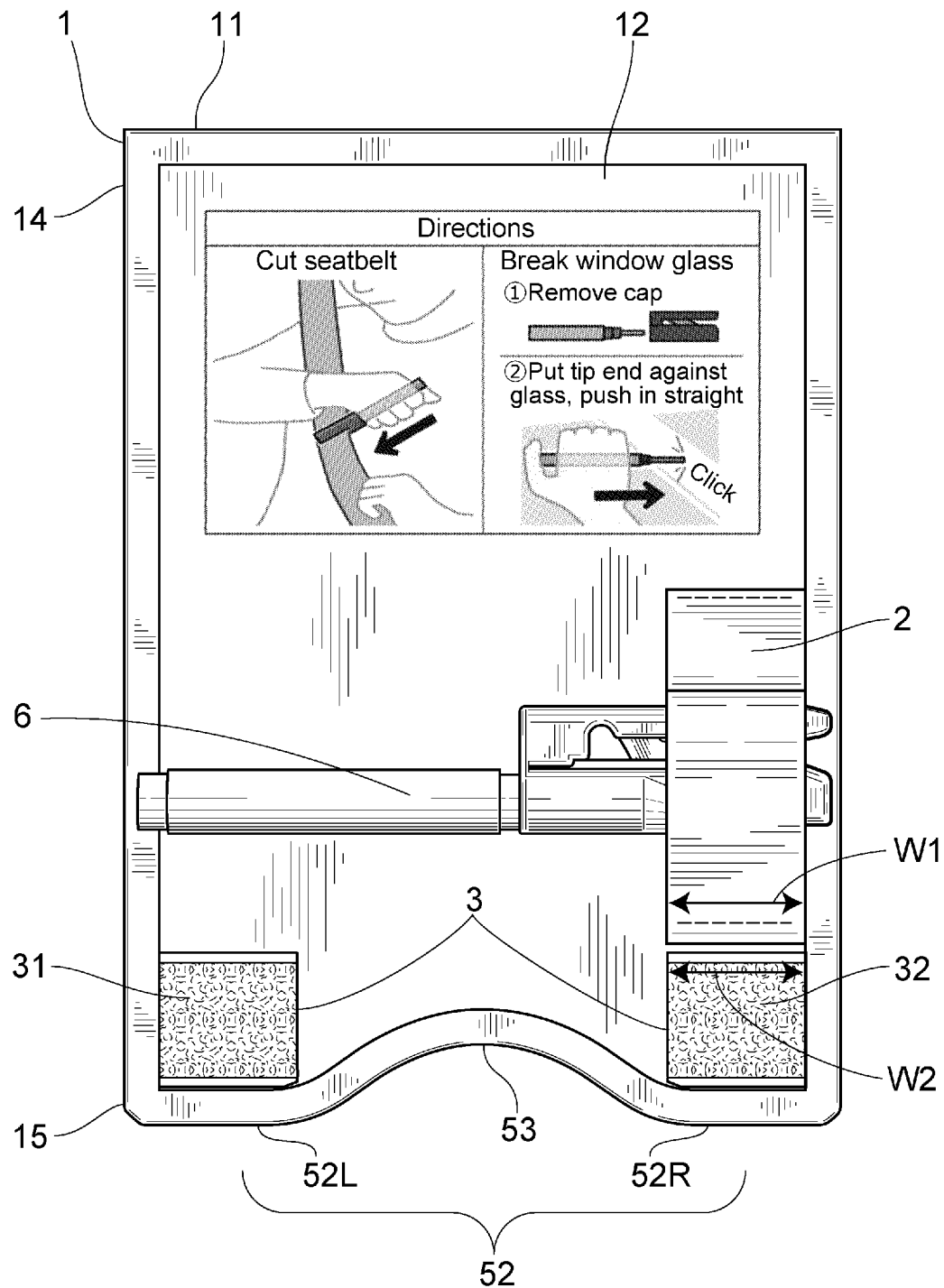
FIG. 1 is an unrolled view showing an inner side of an escape tool housing member of a first embodiment of the present invention.
Figure 2:
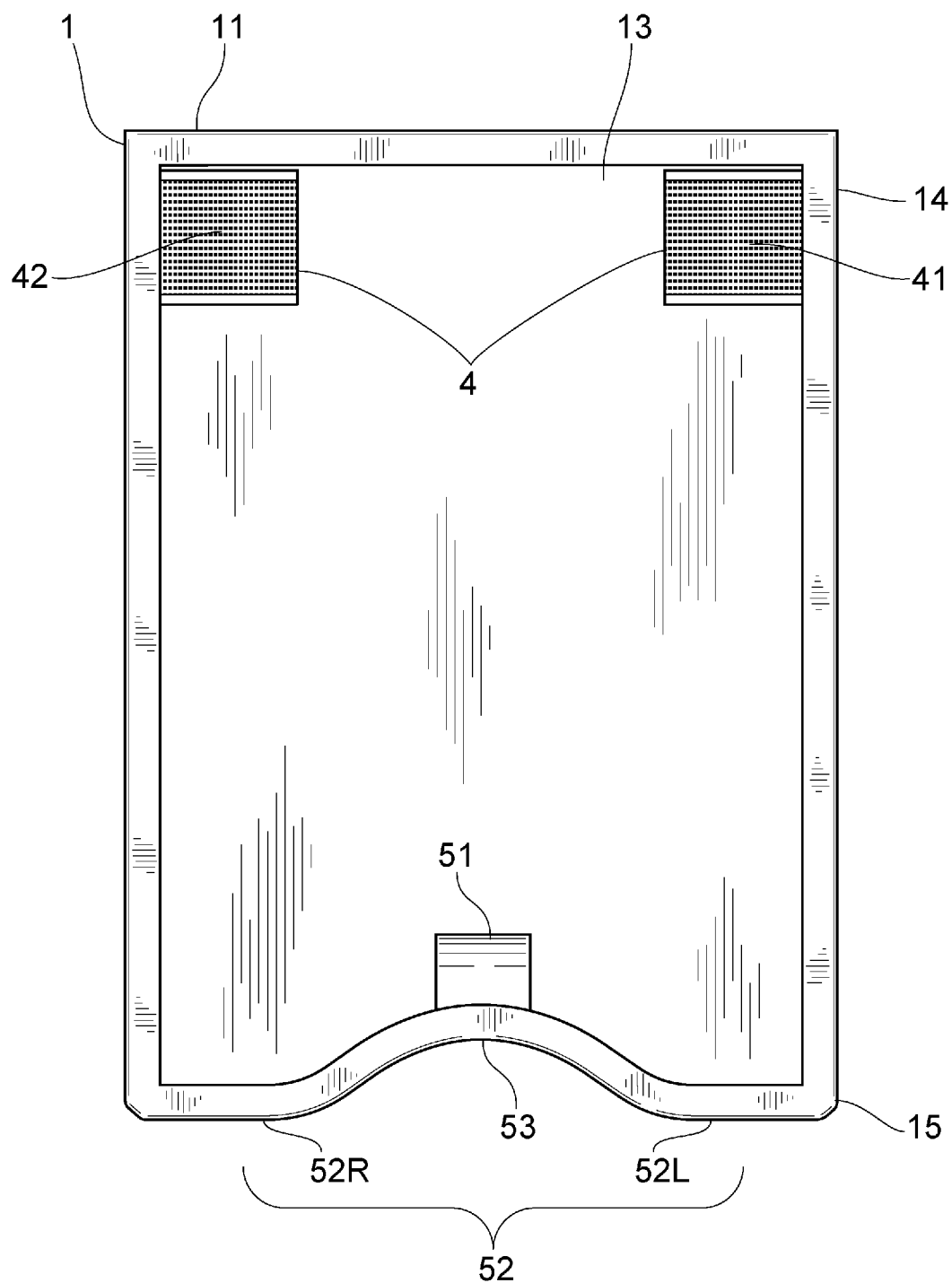
FIG. 2 is an unrolled view showing an outer side of the escape tool housing member of the first embodiment of the present invention.

FIGS. 1 to 8 show an escape tool housing member of a first embodiment of the present invention. As shown in FIGS. 1 and 2, a main body 11 of an escape tool housing member 1 is a sheet-shaped member, and is substantially formed into a quadrangular shape. A convex portion 52 and a concave portion 53 are formed at a main body lower end 15 as one end of the main body 11. The convex portion 52 is composed of a left convex portion 52L and a right convex portion 52R with the concave portion 53 being interposed therebetween.

As shown FIG. 1, an inner fixation portion 3 is formed at the main body lower end 15 on a main body inner side 12. The inner fixation portion 3 is composed of a left inner fixation portion 31 and a right inner fixation portion 32. The left inner fixation portion 31 is formed at the left convex portion 52L, and the right inner fixation portion 32 is formed at the right convex portion 52R. The left inner fixation portion 31 and the right inner fixation portion 32 are the hook sides of a so-called hook and loop fastener.

A housing portion 2 is formed in the proximity of the inner fixation portion 3 (right inner fixation portion 32) on the main body inner side 12. In this embodiment, although the housing portion 2 is proximal to the inner fixation portion 3 (right inner fixation portion 32), the housing portion 2 may also be formed adjacent to the inner fixation portion 3 (right inner fixation portion 32) instead. Here, "proximal to" refers to a state where parts are located immediately close to each other, whereas "adjacent to" refers to a state where parts are next to and in contact with each other. The housing portion 2 is arranged as a belt-shaped member formed long in the vertical direction along the main body inner side 12, and is capable of storing one end of an escape tool 6 by sandwiching the same between the housing portion 2 itself and the main body inner side 12. As for the housing portion 2 of this embodiment, although a width W1 thereof in the left-right direction (shorter direction) is formed substantially identical to a width W2 of the right inner fixation portion 32 in the left-right direction, the width W1 of the housing portion 2 can be changed as necessary. Further, although the housing portion 2 of this embodiment is provided proximal to the upper side of the right inner fixation portion 32, since the position of the housing portion 2 in the left-right direction can be a desired position, the housing portion 2 may be provided adjacent or proximal to the upper side of the left inner fixation portion 31. Further, there may be employed two housing portions 2 with one of them being provided on the upper side of the left inner fixation portion 31, and the other being provided on the upper side of the right inner fixation portion 32, so that the escape tool 6 can be stored with both ends thereof being held in a sandwiched manner.

As shown in FIG. 2, an outer fixation portion 4 is formed at a main body upper end 14 as the other end of a main body outer side 13. The outer fixation portion 4 is composed of a left outer fixation portion 41 and a right outer fixation portion 42. When viewed from the main body outer side 13, the left outer fixation portion 41 is formed in the upper right corner of the main body upper end 14 as the other end of the main body outer side 13. This is to say that when viewed from the main body inner side 12, the left outer fixation portion 41 is located on the backside of the upper left corner of the main body upper end 14. Further, when viewed from the main body outer side 13, the right outer fixation portion 42 is formed in the upper left corner of the main body upper end 14 as the other end of the main body outer side 13. This is to say that when viewed from the main body inner side 12, the right outer fixation portion 42 is located on the backside of the upper right corner of the main body upper end 14. The left outer fixation portion 41 and the right outer fixation portion 42 are the loop sides of a so-called hook and loop fastener. A pull portion 51 is formed proximal to a concave portion 53 formed at the main body lower end 15 of the main body outer side 13.

Figure 3:
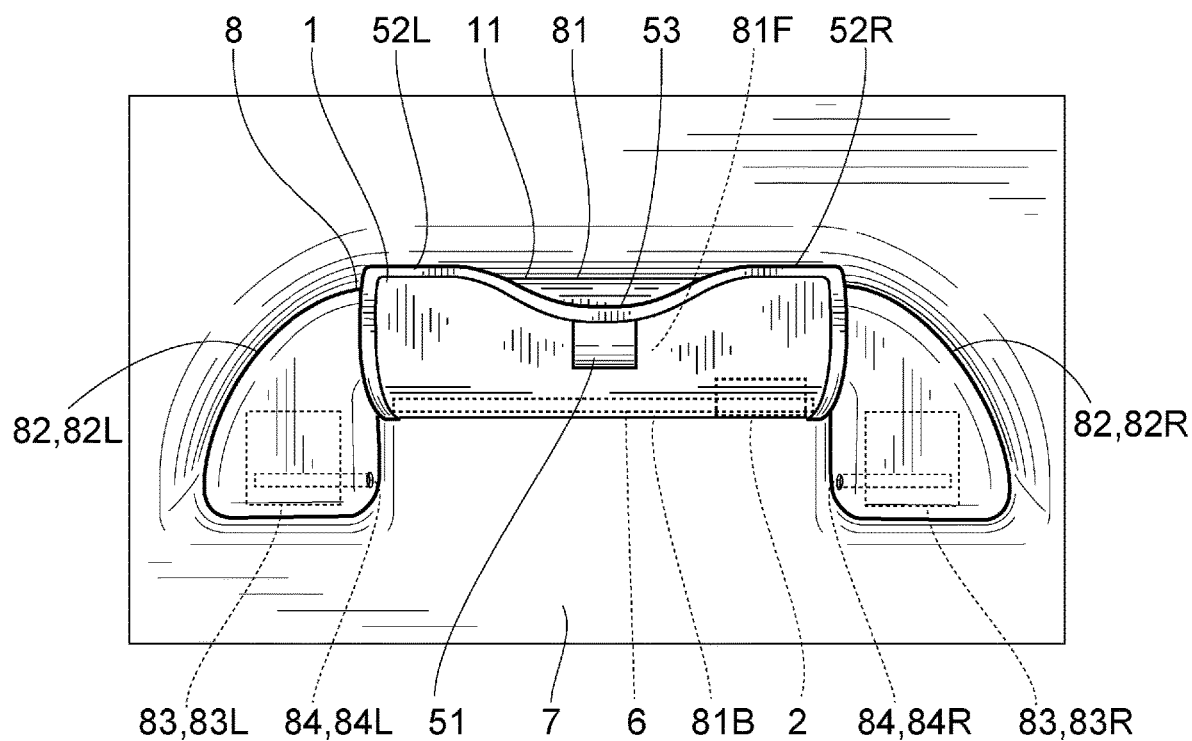
FIG. 3 is a front view showing a state where the escape tool housing member of the first embodiment of the present invention is wound around an assist grip.

As shown in FIG. 3, the escape tool housing member 1 is wound around an assist grip 8. The assist grip 8 is formed in a way such that a curved portion 82 is joined to both ends of a grip portion 81 extended into the shape of a bar. The curved portion 82 is composed of a left curved portion 82L and a right curved portion 82R. The curved portions 82L, 82R are bent at about 90 degrees in an arc-like fashion, and an attachment portion 83 is formed at an end portion of each curved portion that is opposite to an end portion joined to the grip portion 81. The attachment portion 83 is composed of a left attachment portion 83L and a right attachment portion 83R. Further, a shaft portion 84 is formed in each of the attachment portions 83L, 83R. The shaft portion 84 is composed of a left shaft portion 84L and a right shaft portion 84R. The left curved portion 82L is formed at one end of the grip portion 81, and the right curved portion 82R is formed at the other end of the grip portion 81. The left shat portion 84L is formed in the left curved portion 82L, and the right shat portion 84R is formed in the right curved portion 82R.

As for the main body 11 of the escape tool housing member 1, the length thereof in the shorter direction is substantially identical to the length of the grip portion 81 in the longer direction. Further, the main body 11 of the escape tool housing member 1 is to be wound around the grip portion 81 in a way such that the shorter direction of the main body 11 is at first matched in parallel with the longer direction of the grip portion 81, followed by allowing the main body inner side 12 to abut against the grip portion 81, and then winding the main body 11 with the main body upper end 14 being a starting point and the main body lower end 15 being an ending point. At that time, the escape tool 6 arranged along the longer direction of the grip portion 81 is housed in the housing portion 2. Moreover, the housing portion 2 is to be wound with the housing portion 2 itself being interposed between the left curved portion 82L and the right curved portion 82R as the curved portions 82, and with the housing portion 2 itself abutting against a grip portion bottom surface 81B. In this way, the escape tool 6 stored in the housing portion 2 abuts against the grip portion bottom surface 81B as the inner side of the grip portion 81, along the longer direction of the grip portion 81. Further, the left convex portion 52, the pull portion 51, the concave portion 53 and the right convex portion 52R are to be wound in a way such that they will be positioned proximal to a grip portion front surface 81F as a side surface joined to the grip portion bottom surface 81B. Next, the left inner fixation portion 31 and the left outer fixation portion 41 are to be connected to the right inner fixation portion 32 and the right outer fixation portion 42 respectively so that the escape tool housing member 1 can then be fixed to the assist grip 8. Here, since the left inner fixation portion 31 is formed at the left convex portion 52L, and is aligned in a straight line with the left outer fixation portion 41 along the longer direction of the main body 11, the left inner fixation portion 31 and the left outer fixation portion 41 are connected to each other at the position of the left convex portion 52L. Similarly, since the right inner fixation portion 32 is formed at the right convex portion 52R, and is aligned in a straight line with the right outer fixation portion 42 along the longer direction of the main body 11, the right inner fixation portion 32 and the right outer fixation portion 42 are connected to each other at the position of the right convex portion 52R. Further, since the pull portion 51 is provided at the concave portion 53, as shown in FIG. 3, after the escape tool housing member 1 has been wound around the assist grip 8, the pull portion 51 can be positioned at the same position as or below the connected area of the left inner fixation portion 31 and the left outer fixation portion 41 as well as the connected area of the right inner fixation portion 32 and the right outer fixation portion 42 in the vertical direction.

Figure 4A:
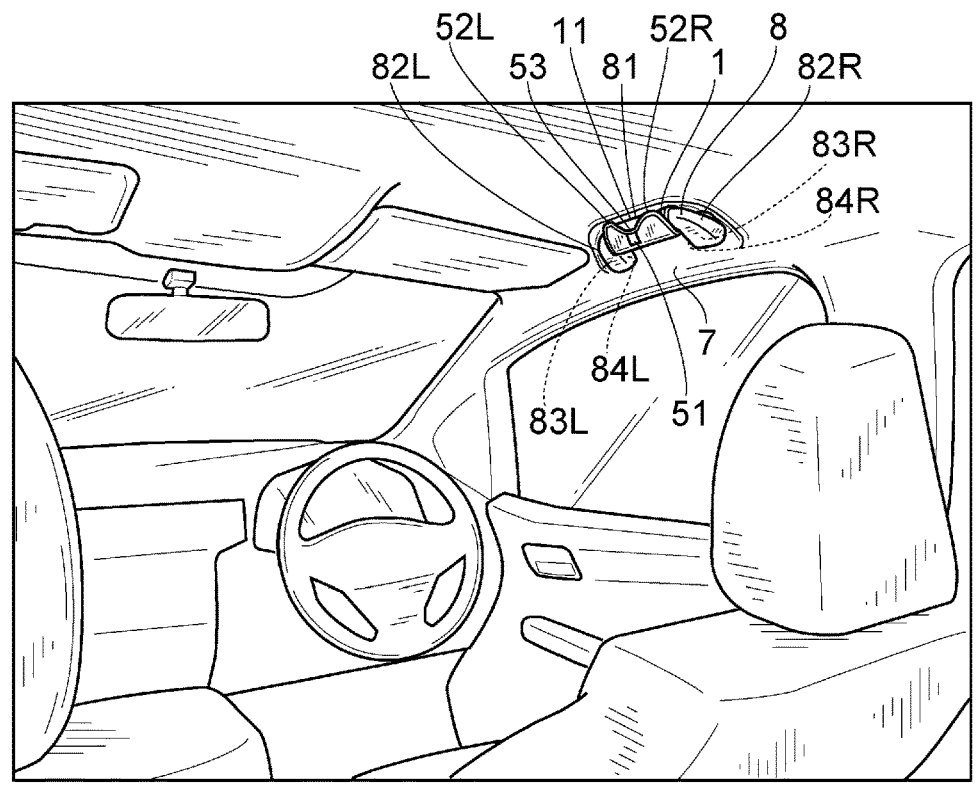
FIG. 4A is a diagram showing a usage state where the escape tool housing member of the first embodiment of the present invention is wound around an assist grip installed in the interior of a vehicle (a state where the assist grip is received).
Figure 4B:
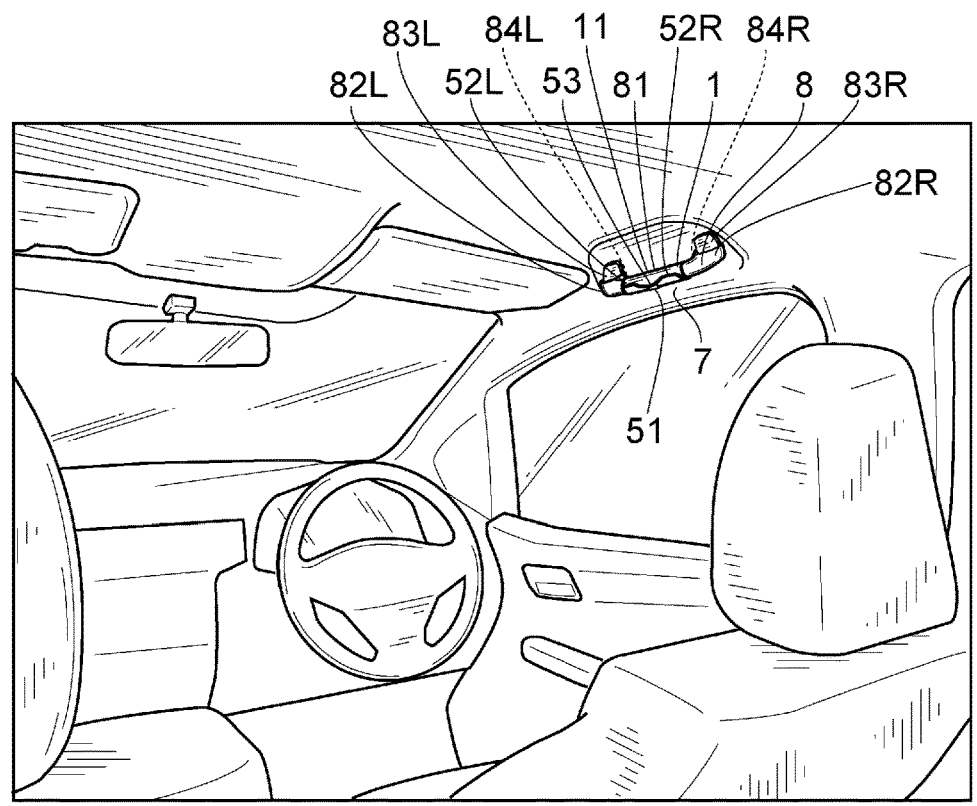
FIG. 4B is a diagram showing a usage state where the escape tool housing member of the first embodiment of the present invention is wound around an assist grip installed in the interior of a vehicle (a state where the assist grip is being used).

As shown in FIG. 4, the assist grip 8 is attached to a vehicle interior member 7. Further, the main body 11 of the escape tool housing member 1 is to be wound around the grip portion 81 in a way such that the left convex portion 52L, the pull portion 51, the concave portion 53 and the right convex portion 52R will be positioned on the surface of the grip portion 81. As shown in FIG. 4A, when installing the assist grip 8, the assist grip 8 is to be arranged along the vehicle interior member 7. As shown in FIG. 4B, when using the assist grip 8, a user of the assist grip 8 can rotate the assist grip 8 about the left shat portion 84L provided at the left attachment portion 83L formed at the end portion of the left curved portion 82L, and about the right shat portion 84R provided at the right attachment portion 83R formed at the end portion of the right curved portion 82R.

Figure 5:
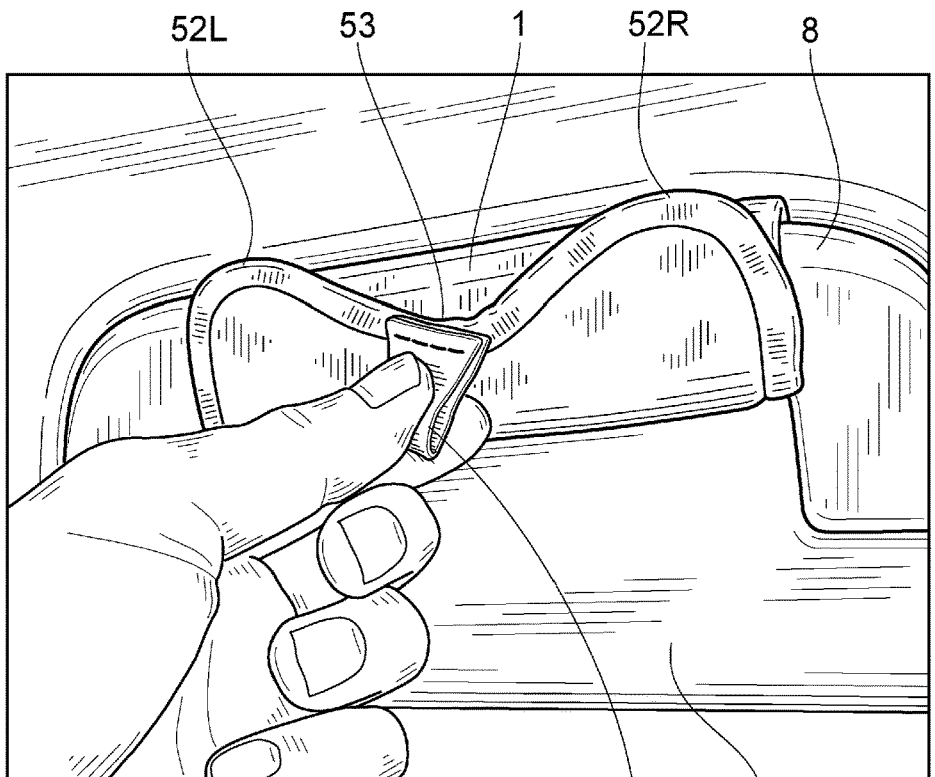
FIG. 5 is a diagram showing a state where a pull portion of the escape tool housing member of the first embodiment of the present invention is being pulled by a left hand.
Figure 6:
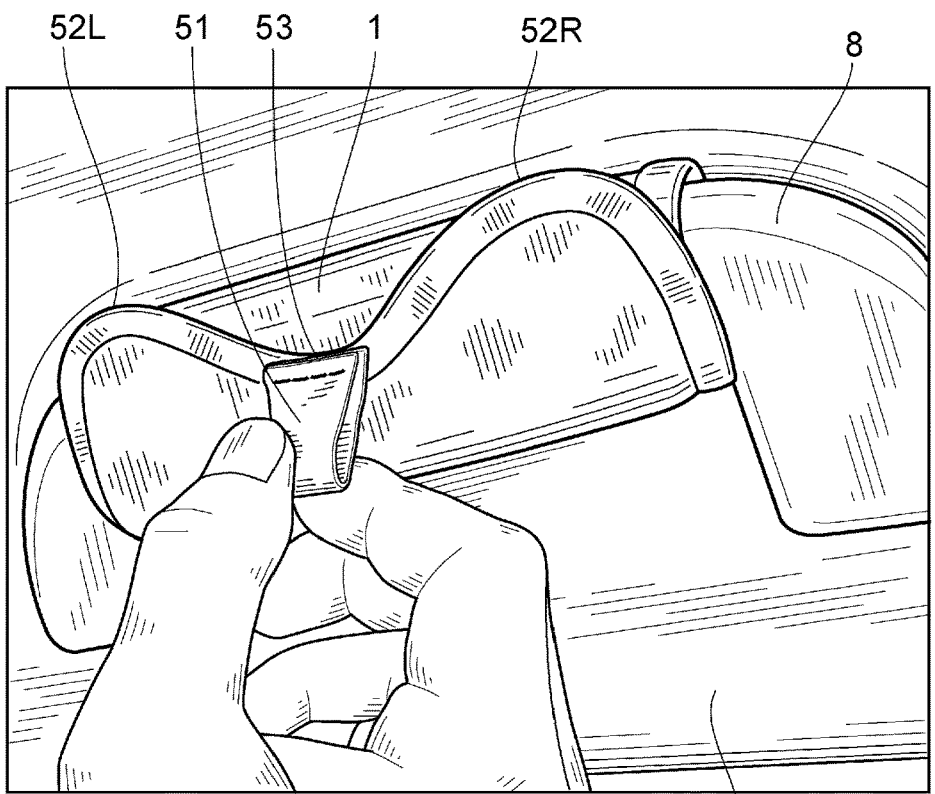
FIG. 6 is a diagram showing a state where a pull portion of the escape tool housing member of the first embodiment of the present invention is being pulled by a right hand.

As shown in FIGS. 5 and 6, by pinching and then pulling with fingers the pull portion 51 from the state where the escape tool housing member 1 is wound around the assist grip 8, the left inner fixation portion 31 and the left outer fixation portion 41 will be disconnected from each other, and the right inner fixation portion 32 and the right outer fixation portion 42 will be disconnected from each other as well, thereby allowing the escape tool housing member 1 to be removed from the assist grip 8. Here, since the pull portion 51 protrudes downward when installing the assist grip 8, the pull portion 51 can be easily pinched and then pulled with either the left or right hand.

Figure 7:
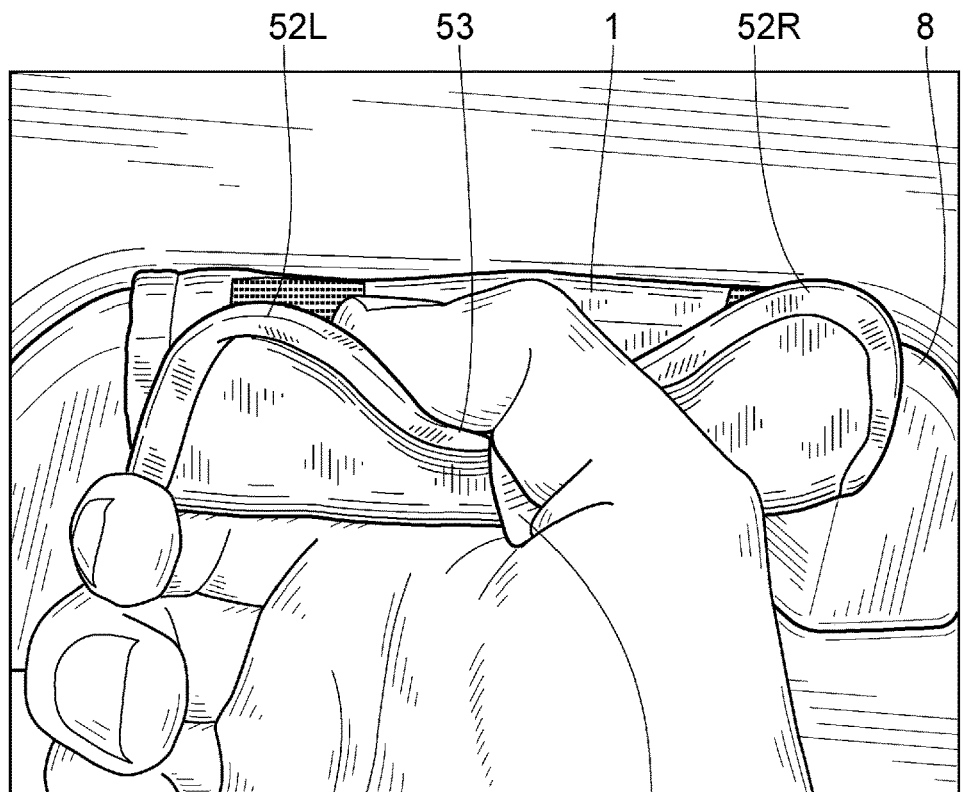
FIG. 7 is a diagram showing a state where a convex portion of the escape tool housing member of the first embodiment of the present invention is being pulled by a right hand.
Figure 8:
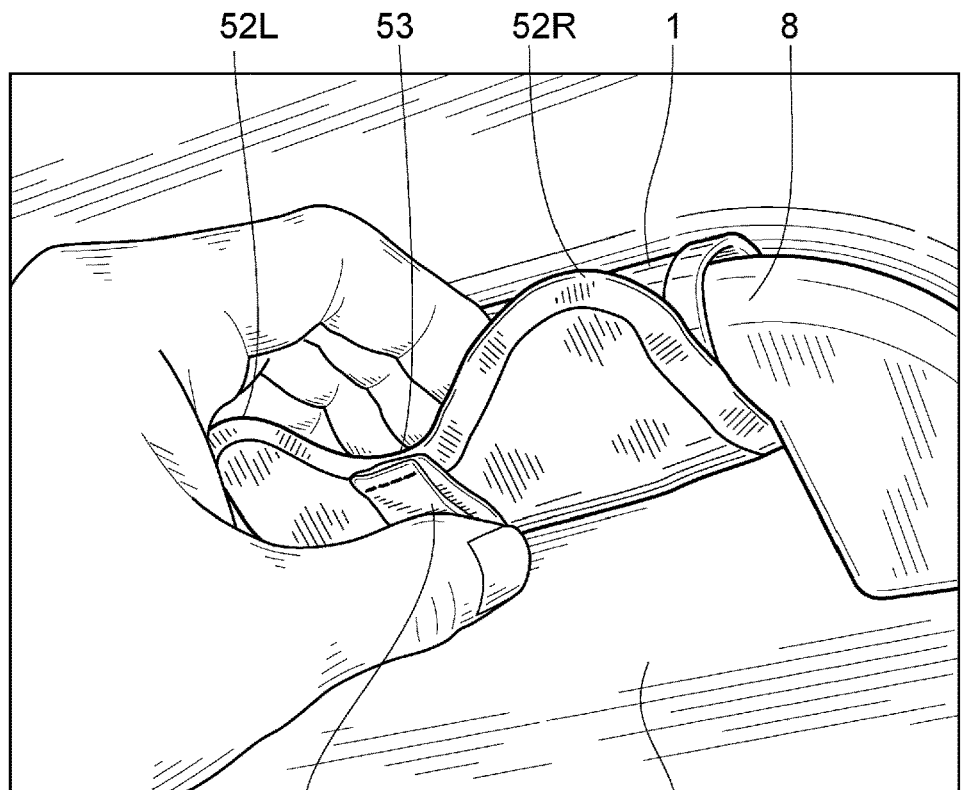
FIG. 8 is a diagram showing a state where a concave portion of the escape tool housing member of the first embodiment of the present invention is being pulled by a left hand.

As shown in FIGS. 7 and 8, by pinching and then pulling with fingers either one of the left convex portion 52L and the right convex portion 52R of the escape tool housing member 1 or both the left convex portion 52L and the right convex portion 52R of the escape tool housing member 1, the left inner fixation portion 31 and the left outer fixation portion 41 will be disconnected from each other, and the right inner fixation portion 32 and the right outer fixation portion 42 will be disconnected from each other as well, thereby allowing the escape tool housing member 1 to be removed from the assist grip 8. Further, by inserting fingers into the inner side (main body inner side 12 side) of the escape tool housing member 1 wound from the concave portion 53, and then pulling the escape tool housing member 1 toward oneself, the left inner fixation portion 31 and the left outer fixation portion 41 can be disconnected from each other, and the right inner fixation portion 32 and the right outer fixation portion 42 can be disconnected from each other as well. Here, while the left inner fixation portion 31 is provided on the main body inner side 12 side of the left convex portion 52L, and the right inner fixation portion 32 is provided on the main body inner side 12 side of the right convex portion 52R, no fixation portion is provided on the main body inner side 12 side of the concave portion 53. Thus, since the main body inner side 12 side of the concave portion 53 is not connected via a fixation portion, fingers can be easily inserted thereinto. Further, by inserting fingers from the concave portion 53 and then pinching and pulling either one of the left convex portion 52L and the right convex portion 52R or both the left convex portion 52L and the right convex portion 52R, the escape tool housing member 1 can be easily removed from the assist grip 8.

In addition, the escape tool housing member 1 of this embodiment is such that the main body 11 is formed into the shape of a sheet, the housing portion 2 is formed into the shape of a belt, the inner fixation portion 3 and the outer fixation portion 4 are hook and loop fasteners i.e. all are formed as thin members. Thus, the escape tool housing member 1 can be tightly wound around the assist grip 8, and the assist grip 8 will not be prevented from being grabbed even with the escape tool housing member 1 being wound therearound.

As described above, the escape tool housing member 1 of this embodiment is to be wound around the assist grip 8 that is to be attached to the vehicle interior member 7. The escape tool housing member 1 has the sheet-shaped main body 11; the housing portion 2 that is provided on the main body inner side 12 of the main body 11 and houses the escape tool 6; the inner fixation portion 3 provided on the main body inner side 12 of the main body 11; and the outer fixation portion 4 provided on the main body outer side 13 of the main body 11. The main body 11 is capable of being fixed to the assist grip 8 by connecting the inner fixation portion 3 and the outer fixation portion 4; since the inner fixation portion 3 and the housing portion 2 are proximal to each other, the escape tool housing member 1 can be wound around the assist grip 8 that is to be attached to the vehicle interior member 7. Further, in the state where the escape tool housing member 1 is already attached to the assist grip 8, the escape tool 6 housed in the housing portion 2 can be arranged on the grip portion bottom surface 81B as the inner side of the grip portion 81, along the longer direction of the grip portion 81 of the assist grip 8.

Further, in the escape tool housing member 1 of this embodiment, the assist grip 8 has the grip portion 81 extended into the shape of a bar; and the attachment portion 83 allowing the grip portion 81 to be attached to the vehicle interior member 7. Since the housing portion 2 houses the escape tool 6 arranged along the longer direction of the grip portion 81, the assist grip 8 can still be grabbed even with the escape tool housing member 1 being attached.

Furthermore, in the escape tool housing member 1 of this embodiment, since the pull portion 51 is provided on the main body outer side 13 of the main body 11, the inner fixation portion 3 and the outer fixation portion 4 can be easily disconnected from each other by pulling the pull portion 51.

Furthermore, in the escape tool housing member 1 of this embodiment, since the convex portion 52 and the concave portion 53 are provided at the main body lower end 15 of the main body 11, the inner fixation portion 3 and the outer fixation portion 4 can be easily disconnected from each other by, for example, pinching the convex portion 52, or hooking fingers on the concave portion 53 and then pulling the same.

Furthermore, in the escape tool housing member 1 of this embodiment, since the inner fixation portion 3 is provided at the convex portion 52, and the outer fixation portion 4 is provided at the main body upper end 14 of the main body 11, fingers can be put inside the concave portion 53 to pull the same, thereby allowing the inner fixation portion 3 and the outer fixation portion 4 to be easily disconnected from each other.

Furthermore, the escape tool housing member 1 of this embodiment is to be wound with the housing portion 2 being interposed between the attachment portions 83 and abutting against the grip portion bottom surface 81B as the inner side of the grip portion 81, and with the pull portion 51 being positioned proximal to the grip portion front surface 81F as the side surface joined to the grip portion bottom surface 81B which is the inner side of the grip portion 81. Thus, the escape tool 6 can be housed in a compact manner, and will not be a hindrance when grabbing the grip portion 81 of the assist grip 8.

Furthermore, as for the escape tool housing member 1 of this embodiment, since the assist grip 8 is capable of rotating about the shaft portion 84 provided at the attachment portion 83, the assist grip 8 can be rotated to a position suitable for use by a user before use.

However, the present invention is not limited to the above embodiment. Various modified embodiments are possible within the scope of the gist of the present invention. For example, although the main body employs a cloth material, it may also employ a mesh-type net material or a plastic material. While the fixation portion employs a hook and loop fastener, it may also employ a fastening member such as a snap button or an adhesive tape. The assist grip may be either of a rotary or stationary type.

DESCRIPTION OF THE SYMBOLS

1 Escape tool housing member
11 Main body
12 Main body inner side
13 Main body outer side
14 Main body upper end
15 Main body lower end
2 Housing portion
3 Inner fixation portion
31 Left inner fixation portion
32 Right inner fixation portion
4 Outer fixation portion
41 Left outer fixation portion
42 Right outer fixation portion
51 Pull portion
52 Convex portion
52L Left convex portion
52R Right convex portion
53 Concave portion
6 Escape tool
7 Vehicle interior member
8 Assist grip
81 Grip portion
81B Grip portion bottom surface
81F Grip portion front surface
82 Curved portion
82L Left curved portion
82R Right curved portion
83 Attachment portion
83L Left attachment portion
83R Right attachment portion
84 Shaft portion
84L Left shaft portion
84R Right shaft portion
W1 Width of housing portion 2 in left-right direction
W2 Width of right inner fixation portion 32 in left-right direction

What is claimed is:

1. An escape tool housing member to be wound around an assist grip that is to be attached to a vehicle interior member, comprising:
    a sheet-shaped main body;
    a housing portion that is provided on an inner side of the sheet-shaped main body and houses an escape tool;
    an inner fixation portion provided on the inner side of the sheet-shaped main body at one end of the sheet-shaped main body;
    an outer fixation portion provided on an outer side of the sheet-shaped main body at an opposite end of the sheet-shaped main body located opposite to the one end of the sheet-shaped main body; and
    a pull portion that is provided on the outer side of the sheet-shaped main body at the one end of the sheet-shaped main body,
    wherein the sheet-shaped main body is capable of being fixed to the assist grip by connecting the inner fixation portion and the outer fixation portion,
    the opposite end of the sheet-shaped main body is an end portion not exposed to the outside as being rolled into the inner side of the sheet-shaped main body when the escape tool housing member is wound around the assist grip,
    the one end of the sheet-shaped main body is an end portion that is opposite to the opposite end of the sheet-shaped main body, and is exposed to the outside when the escape tool housing member is wound around the assist grip, and
    the inner fixation portion and the housing portion are adjacent or proximal to each other.

2. An escape tool housing member to be wound around an assist grip that is to be attached to a vehicle interior member, comprising:
    a sheet-shaped main body;
    a housing portion that is provided on an inner side of the sheet-shaped main body and houses an escape tool;
    an inner fixation portion provided on the inner side of the sheet-shaped main body; and
    an outer fixation portion provided on an outer side of the sheet-shaped main body,
    wherein the sheet-shaped main body is capable of being fixed to the assist grip by connecting the inner fixation portion and the outer fixation portion, the inner fixation portion and the housing portion are adjacent or proximal to each other, a convex portion and a concave portion are provided at one end of the sheet-shaped main body, the concave portion has a shape concaved toward an opposite end of the sheet-shaped main body, the opposite end of the sheet-shaped main body is an end portion not exposed to the outside as being rolled into the inner side of the sheet-shaped main body when the escape tool housing member is wound around the assist grip, and the one end of the sheet-shaped main body is an end portion that is opposite to the opposite end of the sheet-shaped main body, and is exposed to the outside when the escape tool housing member is wound around the assist grip.

3. The escape tool housing member according to claim 2, wherein the convex portion comprises a left convex portion and a right convex portion with the concave portion being interposed between the left convex portion and the right convex portion.

4. The escape tool housing member according to claim 2, wherein a pull portion is provided at the concave portion.

* * * * *